United States Patent Office 3,060,083
Patented Oct. 23, 1962

3,060,083
STABILIZED PESTICIDAL COMPOSITIONS
Ralph B. Fearing, Hammond, Ind., and Edward N. Walsh, Chicago Heights, Ill., assignors to Stauffer Chemical Company, New York, N.Y., a corporation of Delaware
No Drawing. Filed Jan. 18, 1960, Ser. No. 2,864
8 Claims. (Cl. 167—42)

This invention relates to methyl parathion dust formulations which have been stabilized against the degrading effect of carrier dust by the presence of a stabilizing compound.

Methyl parathion $[(CH_3O)_2P(S)OC_6H_4NO_2]$ hereafter sometimes referred to as MPT, is a well known organophosphorus pesticide which has found widespread use, particularly in combatting insects and other pests in cotton crops. This compound has generally been applied in the form of a dust composition containing a small percentage of the active material. It has been found, however, that when formulated into such dust compositions the carrier dust creates in the methyl parathion a tendency to degrade, resulting in a product with lower assay and decreased effectiveness.

It has now been discovered that this loss in effectiveness can be prevented or decreased by incorporating in the dust formulation a stabilizer selected from the group consisting of triethyl phosphate, acetal, methyl butynol, furfuryl alcohol, and mixtures thereof. These stabilizers apparently function by inhibiting the degrading effect of the carrier dust on methyl parathion, thus greatly extending the useful life of the compositions.

A typical pesticidal dust formulation comprises the active pesticide compound, a highly absorbent carrier dust, and an inert diluent dust. The formulations are generally prepared by first adding the active ingredient to the highly absorbent carrier dust to produce a dust concentrate having about 10–30% by weight of MPT. This concentrate is then diluted, either immediately or sometime prior to use, with the relatively inert diluent dust. Suitable formulations for actual field use generally contain about 1–6% of methyl parathion.

One method of utilizing the stabilizers of the present invention is to add the stabilizer directly to the methyl parathion in an amount of 1–10% and then blend this mixture into the carrier dust. A second method is to apply the stabilizer directly to the carrier dust in an amount sufficient to stabilize the dust prior to the addition of the methyl parathion. Usually an amount in the range of 1–10% by weight of the MPT to be added is sufficient. After this has been thoroughly blended into the carrier dust, the methyl parathion is then added in the regular manner.

The clays which form suitable carrier dusts for the purpose of these formulations are of the two general types known as attapulgite and montmorillonite. These are well known substances which have been well described in the literature. Attapulgite is a magnesium-rich clay with a unique chainlike lattice structure. The montmorillonite group of clays includes montmorillonite, beidellite, nontronite, hectorite, saponite and sauconite. Both of these two types of clays are readily available under a variety of trade names. Several commercial brand names are noted in Table I.

Among the inert diluents which are suitable for the purposes of this invention are calcium carbonate, synthetic calcium silicates, various talcs and pyrophyllites. These products are also readily available commercially in a variety of different grades.

The following Table I illustrates the value of the stabilizers of the present invention. For the data of the table, a series of tests was carried out in which a number of carrier dusts carrying varying amounts of MPT were stabilized with varying quantities of the stabilizers of the invention, and maintained at 50° C. for one week, a period of time which was found to be roughly equivalent to six weeks at room temperature. In each case a control formulation was used which was identical with the stabilized dust except for the stabilizer. The severity of the tests was deliberately exaggerated by omitting any diluent dust, since an inhibitor which is effective in the presence of 100° pure (i.e., undiluted) carrier dust will certainly be effective in a finished field formulation wherein the degrading effect of the carrier dust is reduced by the presence of diluents.

The assay data for Table I were obtained by extracting the MPT in a chromatographic column followed by infrared analysis based on absorption at 8.16 microns in a carbon disulfide solution. The final assay was determined by comparison with a known reference curve.

TABLE I
*Stabilization of Carrier Dusts*

| Dust Type | MPT Concentration, Weight Percent | Stabilizer | Stabilizer Concentration, Weight Percent | Loss of Assay, Percent | |
|---|---|---|---|---|---|
| | | | | Control | Stabilized |
| Montmorillonite [2] | 2.5 | Triethylphosphate | 1.3 | 26 | 3.2 |
| Montmorillonite+kaolin[3]+CaCO[3] | 2.5 | do | 0.2 | 14 | 6.0 |
| Do | 2.5 | Acetal | 0.3 | 14 | 7.6 |
| Montmorillonite | 2.5 | do | 2.0 | 26 | 7.5 |
| Do | 25 | do | 2.8 | 10 | 2.4 |
| Attapulgite [1] | 25 | do | 1.0 | 14 | 7.6 |
| Montmorillonite | 2.5 | Methyl butynol | 1.5 | 26 | 4.0 |
| Attapulgite | 2.5 | do | 1.5 | 40 | 28 |
| Do | 2.5 | Furfuryl alcohol | 3.5 | 40 | 22 |

[1] Attaclay—Minerals and Chemicals Co.
[2] Pikes Peak—General Reduction Co.
[3] Seminole—Southern Clays.

It can be clearly seen from Table I that the new stabilizers reduce degradation by a minimum of about 30% and in some cases by nearly 90%.

The stabilizers of the present invention are readily available as commercial chemicals. Triethyl phosphate $[(C_2H_5O)_3P=O]$, acetal $[CH_3CH(OC_2H_5)_2]$, methyl butynol $[CH_3C(CH_3)(OH)C \equiv CH]$ and furfuryl alcohol $[C_4H_3OCH_2OH]$ may each be used as the ordinary commercial product with no interference or adverse effects resulting from the presence of the impurities usually found in the industrial grade products.

The precise amount of stabilizer used is not a critical factor in the success of this invention. Of prime importance is the economic balance between the cost of the stabilizer necessary to prevent the loss of a certain amount of MPT. Generally speaking, an amount of stabilizer of about 1–10% by weight of the MPT may be used with an economic advantage.

The terms pesticide and pesticidal herein are intended to refer to compositions for killing the insect-like creatures commonly referred to as insects but including spiders, mites, aphids, etc. which are not true insects.

The foregoing detailed description has been given for clearness of understanding only, and no unnecessary limitations should be understood therefrom, as modifications will be obvious to those skilled in the art.

What is claimed is:

1. A pesticidal composition comprising methyl parathion and a stabilizer selected from the group consisting of triethyl phosphate, acetal, methyl butynol, furfuryl alcohol and mixtures thereof in an amount sufficient to stabilize said methyl parathion against the degrading effect of contact with attapulgite and montmorillonite carrier dusts.

2. A pesticidal composition comprising methyl parathion and about 1–10% by weight of a stabilizer selected from the group consisting of triethyl phosphate, acetal, methyl butynol, furfuryl alcohol and mixtures thereof.

3. A pesticidal dust composition comprising methyl parathion, a carrier dust selected from the group consisting of attapulgite and montmorillonite clays, a diluent dust and a stabilizer selected from the group consisting of triethyl phosphate, acetal, methyl butynol, furfuryl alcohol and mixtures thereof in an amount sufficient to stabilize said methyl parathion against degradation by said carrier dust.

4. The composition of claim 3 wherein the stabilizer is present in an amount of about 1–10% by weight of the methyl parathion.

5. A pesticidal dust concentrate composition consisting of a carrier dust selected from the group consisting of attapulgite and montmorillonite clays, 10–30% by weight of methyl parathion and a stabilizer selected from the group consisting of triethyl phosphate, acetal, methyl butynol, furfuryl alcohol and mixtures thereof in an amount sufficient to stabilize said methyl parathion against degradation by said carrier dust.

6. A pesticidal concentrate composition consisting of a carrier dust selected from the group consisting of attapulgite and montmorillonite clays, about 10–30% by weight of methyl parathion, and about 1–3% by weight of a stabilizer selected from the group consisting of triethyl phosphate, acetal, methyl butynol, furfuryl alcohol, and mixtures thereof.

7. A pesticidal dust composition consisting of 10–20% of the composition of claim 5 and 90–80% of a diluent dust.

8. A pesticidal dust composition consisting of 10–20% of the composition of claim 6 and 90–80% of a diluent dust.

References Cited in the file of this patent
UNITED STATES PATENTS 2,875,121    Trademan _____ Feb. 24, 1959

OTHER REFERENCES

Hanna: Handbook of Agricultural Chemicals, 2nd Ed. (1958), pages 305, 311.